United States Patent
Lv et al.

(10) Patent No.: US 11,232,005 B2
(45) Date of Patent: Jan. 25, 2022

(54) METHOD, DEVICE, AND COMPUTER PROGRAM PRODUCT FOR MANAGING STORAGE SYSTEM

(71) Applicant: EMC IP Holding Company LLC, Hopkinton, MA (US)

(72) Inventors: Shuo Lv, Beijing (CN); Qingyun Liu, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/885,891

(22) Filed: May 28, 2020

(65) Prior Publication Data

US 2021/0117296 A1    Apr. 22, 2021

(30) Foreign Application Priority Data

Oct. 21, 2019    (CN) .......................... 201911001210.1

(51) Int. Cl.
*G06F 11/00* (2006.01)
*G06F 11/20* (2006.01)
*G06F 11/10* (2006.01)

(52) U.S. Cl.
CPC ...... *G06F 11/2094* (2013.01); *G06F 11/1092* (2013.01); *G06F 2201/82* (2013.01)

(58) Field of Classification Search
CPC ............. G06F 11/1076; G06F 11/1088; G06F 11/1092; G06F 11/2094
See application file for complete search history.

(56) References Cited

U.S. PATENT DOCUMENTS

| | | | |
|---|---|---|---|
| 6,240,416 B1 * | 5/2001 | Immon | G06F 16/27 |
| 7,711,897 B1 * | 5/2010 | Chatterjee | G06F 12/0868 711/114 |
| 8,037,345 B1 | 10/2011 | Iyer et al. | |
| 8,799,705 B2 | 8/2014 | Hallak et al. | |
| 9,367,395 B1 | 6/2016 | Bono et al. | |
| 10,185,639 B1 * | 1/2019 | Chatterjee | G06F 11/1076 |
| 10,289,549 B1 | 5/2019 | Shilane et al. | |
| 10,831,401 B2 | 11/2020 | Gao et al. | |
| 11,061,770 B1 | 7/2021 | Patel et al. | |
| 2006/0156059 A1 * | 7/2006 | Kitamura | G06F 11/1092 714/6.21 |
| 2009/0265510 A1 * | 10/2009 | Walther | G06F 11/1092 711/114 |
| 2016/0217040 A1 * | 7/2016 | Jin | G06F 3/064 |
| 2020/0043524 A1 * | 2/2020 | Roberts | G06F 3/06 |

* cited by examiner

*Primary Examiner* — Michael Maskulinski
(74) *Attorney, Agent, or Firm* — BainwoodHuang

(57) ABSTRACT

A storage system includes stripes, extents included in one stripe among the stripes reside on storage devices in the storage system, respectively, and the storage system includes an address mapping between the stripe and storage devices where the extents reside. Regarding one extent, a storage device where the extent resides is determined among the storage devices based on the address mapping. The stripe is added to a rebuild list of the storage system in accordance with determining the storage device is a failed storage device, the rebuild list comprising a stripe that is to be rebuilt in the storage system. The storage system is rebuilt based on stripes in the rebuild list. Accordingly, the performance of a rebuild operation may be improved, and the time for the rebuild operation may be reduced. Further, there is provided a corresponding device and computer program product for managing a storage system.

20 Claims, 12 Drawing Sheets

METHOD, DEVICE, AND COMPUTER PROGRAM PRODUCT FOR MANAGING STORAGE SYSTEM

CROSS-REFERENCE TO RELATED APPLICATION

This application claims priority to Chinese Patent Application No. CN201911001210.1, on file at the China National Intellectual Property Administration (CNIPA), having a filing date of Oct. 21, 2019, and having "METHOD, DEVICE, AND COMPUTER PROGRAM PRODUCT FOR MANAGING STORAGE SYSTEM" as a title, the contents and teachings of which are herein incorporated by reference in their entirety.

FIELD

Various implementations of the present disclosure relate to storage management, and more specifically, to a method, device and computer program product for building a storage system when a storage device in the storage system fails.

BACKGROUND

With the development of data storage technology, various data storage devices now provide users with increasingly large data storage capability, and also their data access speed has been increased greatly. With the increase of data storage capability, users also impose higher demands on data reliability and response time of storage systems. So far various data storage systems based on redundant arrays of independent disks (RAID) have been developed to improve data reliability. When one or more disks in a storage system fail(s), data in failed disk(s) can be recovered from other normal disk.

A mapped Redundant Array of Independent Disks (mapped RAID) has been developed. In this mapped RAID, a disk is a logical concept and may include a plurality of extents. Extents comprised in one logical disk may be distributed across different physical storage devices in a resource pool. For a plurality of extents in one stripe of the mapped RAID, these extents are supposed to be distributed across different physical storage devices, so that when a physical storage device where one extent among the plurality of extents resides fails, a rebuild operation may be performed to recover data from a physical storage device where other extent resides.

Due to difference in usage state and time when each storage device comes into service in the resource pool, a certain storage device may fail. It will be understood in view of difference in the numbers of redundant storage devices in storage systems, the numbers of failed storage devices in storage systems also differ without data loss. At this point, it has become a tough technical problem regarding how to build data in a failed storage device as soon as possible and further avoid data loss in the storage system.

SUMMARY

Therefore, it is desirable to develop and implement a technical solution for rebuilding a storage system more effectively. It is desired that the technical solution be compatible with an existing application system to manage a storage system more effectively by reconstructing configurations of the existing storage system.

According to a first aspect of the present disclosure, provided is a method for managing a storage system. The storage system includes a plurality of stripes, a plurality of extents comprised in one stripe among the plurality of stripes reside on a plurality of storage devices in the storage system, respectively, and the storage system includes an address mapping between the stripe and a plurality of storage devices where the plurality of extents reside. In the method, regarding one extent among the plurality of extents, a storage device where the extent resides is determined among the plurality of storage devices based on the address mapping. The stripe is added to a rebuild list of the storage system in accordance with determining the storage device is a failed storage device, the rebuild list including a stripe that is to be rebuilt in the storage system. The storage system is rebuilt based on stripes in the rebuild list.

According to a second aspect of the present disclosure, provided is a device for managing a storage system. The storage system includes a plurality of stripes, a plurality of extents comprised in one stripe among the plurality of stripes reside on a plurality of storage devices in the storage system, respectively, and the storage system includes an address mapping between the stripe and a plurality of storage devices where the plurality of extents reside. The device includes: at least one processor; a volatile memory; and a memory coupled to the at least one processor, the memory having instructions stored thereon, the instructions, when executed by the at least one processor, causing the device to perform acts. The acts include: determining a storage device where the extent resides among the plurality of storage devices based on the address mapping; adding the stripe to a rebuild list of the storage system in accordance with determining the storage device is a failed storage device, the rebuild list including a stripe that is to be rebuilt in the storage system; and rebuilding the storage system based on stripes in the rebuild list.

According to a third aspect of the present disclosure, provided is a computer program product. The computer program product is tangibly stored on a non-transient computer readable medium and includes machine executable instructions which are used to implement a method according to the first aspect of the present disclosure.

BRIEF DESCRIPTION OF THE DRAWINGS

Through the more detailed description in the accompanying drawings, features, advantages and other aspects of the implementations, the present disclosure will become more apparent. Several implementations of the present disclosure are illustrated schematically and are not intended to limit the present invention. In the drawings.

DETAILED DESCRIPTION OF IMPLEMENTATIONS

Figure 1A:
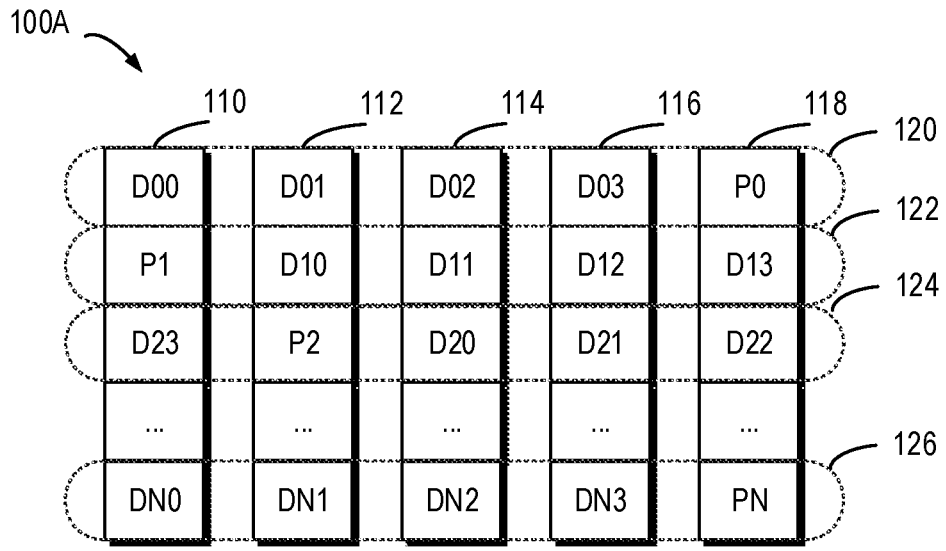
FIGS. 1A and 1B each show a block diagram of a storage system in which a method of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred implementations of the present disclosure will be described in more detail with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

In the context of the present disclosure, the storage system may be a RAID-based storage system. The RAID-based storage system may combine a plurality of storage devices into an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard_RAID_levels and https://en.wikipedia.org/wiki/Nested_RAID_levels, etc.

FIG. 1A schematically illustrates a block diagram of a storage system 100A in which a method of the present disclosure may be implemented. In the storage system shown in FIG. 1A, working principles of RAID are illustrated by taking a RAID-5 (4D+1P, where 4D represents that 4 storage devices are included in the storage system for storing data, and 1P represents that 1 storage device is included in the storage system for storing parity) array that includes five independent storage devices (110, 112, 114, 116 and 118) as an example. It should be noted although five storage devices are schematically shown in FIG. 1A, more or less storage devices may be included in other implementations according to different levels of RAID. Moreover, although FIG. 1A illustrates stripes 120, 122, 124, . . . 126, in other examples the RAID system may further include a different number of stripes.

In RAID, a stripe may cross a plurality of physical storage devices (for example, the stripe 120 crosses storage the devices 110, 112, 114, 116 and 118). The stripe may be simply construed as a storage area among a plurality of storage devices which satisfies a given address range. Data stored in the stripe 120 includes a plurality of parts: a data extent D00 stored in the storage device 110, a data extent D01 stored in the storage device 112, a data extent D02 stored in the storage device 114, a data extent D03 stored in the storage device 116, and a data extent P0 stored in the storage device 118. In this example, the data extents D00, D01, D02 and D03 are stored data, and the data extent P0 is a P parity of the stored data.

The mode of storing data in other stripes 122 and 124 is similar to that in the stripe 120, and the difference is that the parity about other data extent may be stored in other storage device than the storage device 118. In this way, when one of the plurality of storage devices 110, 112, 114, 116 and 118 fails, data in the failed device may be recovered from other normal storage devices.

Figure 1B:
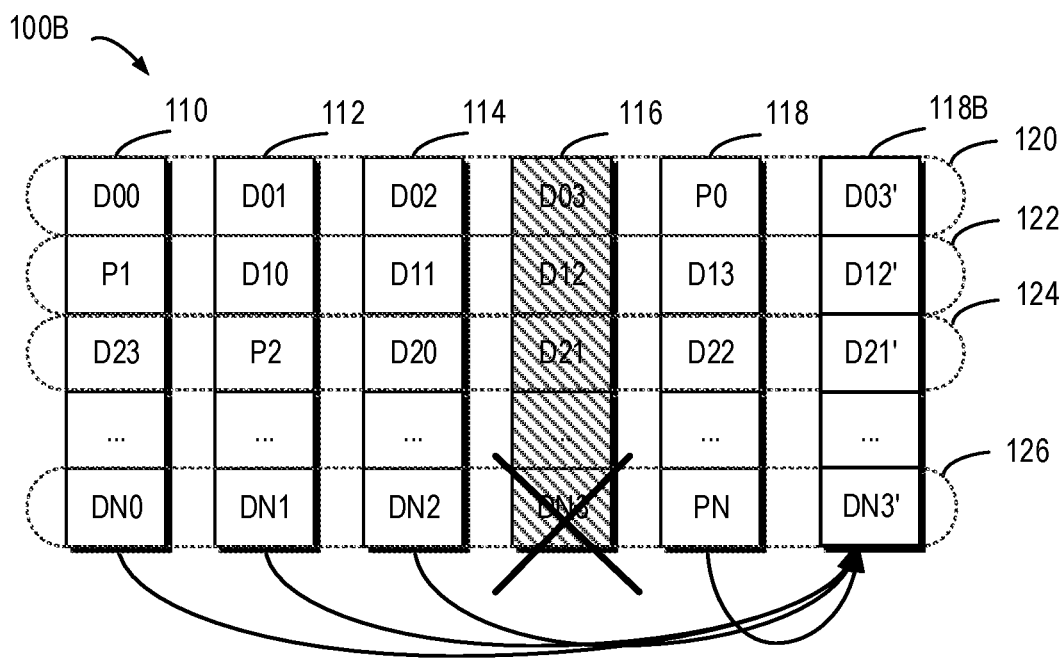

FIG. 1B schematically illustrates a block diagram 100B of rebuilding process of the storage system 100A. As shown in FIG. 1B, when one storage device (e.g., the shaded storage device 116) fails, data may be recovered from the other storage devices 110, 112, 114 and 118 that operate normally. At this point, a new backup storage device 118B may be added to RAID to replace the storage device 118. In this way, recovered data may be written to 118B, and system rebuilding may be realized.

Note while a RAID-5 storage system including 5 storage devices (among which 4 storage devices are used for storing data and 1 storage device is used for storing parity) has been described with reference to FIGS. 1A and 1B, according to definition of other RAID levels, there may further exist a storage system including a different number of storage devices. On the basis of definition of RAID-6, for example, two storage devices may be used to store parity P and Q respectively. For another example, according to definition of triple-parity RAID, three storage devices may be used to store parity P, Q and R respectively.

Figure 2:
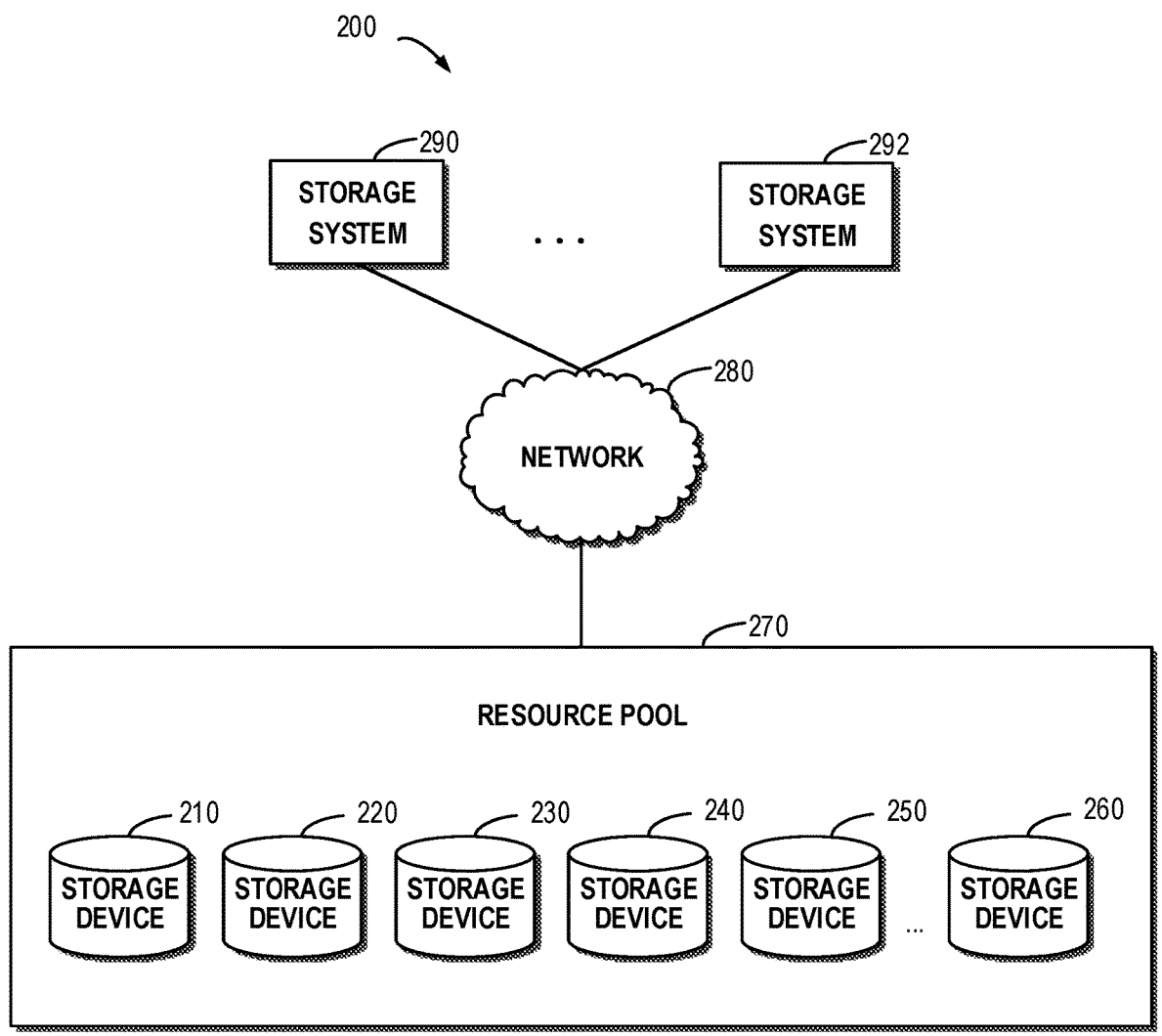
FIG. 2 schematically shows a block diagram of an example environment in which a method of the present disclosure may be implemented.

With the development of distributed storage technologies, the various storage devices 110, 112, 114, 116 and 118 in the storage system shown in FIGS. 1A and 1B may be no longer limited to physical storage devices but may be virtual storage devices. For example, respective extents on the storage device 110 may come from different physical storage devices (hereinafter referred to as storage devices for short) in the resource pool. FIG. 2 schematically shows a block diagram of an example environment 200 in which the method of the present disclosure may be implemented. As depicted, a storage resource pool 270 may include a plurality of physical storage devices 210, 220, 230, 240, 250, . . . , 260. At this point, storage space in the plurality of storage devices may be allocated to a plurality of storage systems 290, . . . , 292. At this point, these storage systems 290, . . . , 292 may access the storage space in the various storage devices in the storage resource pool 270 via a network 280.

Figure 3:
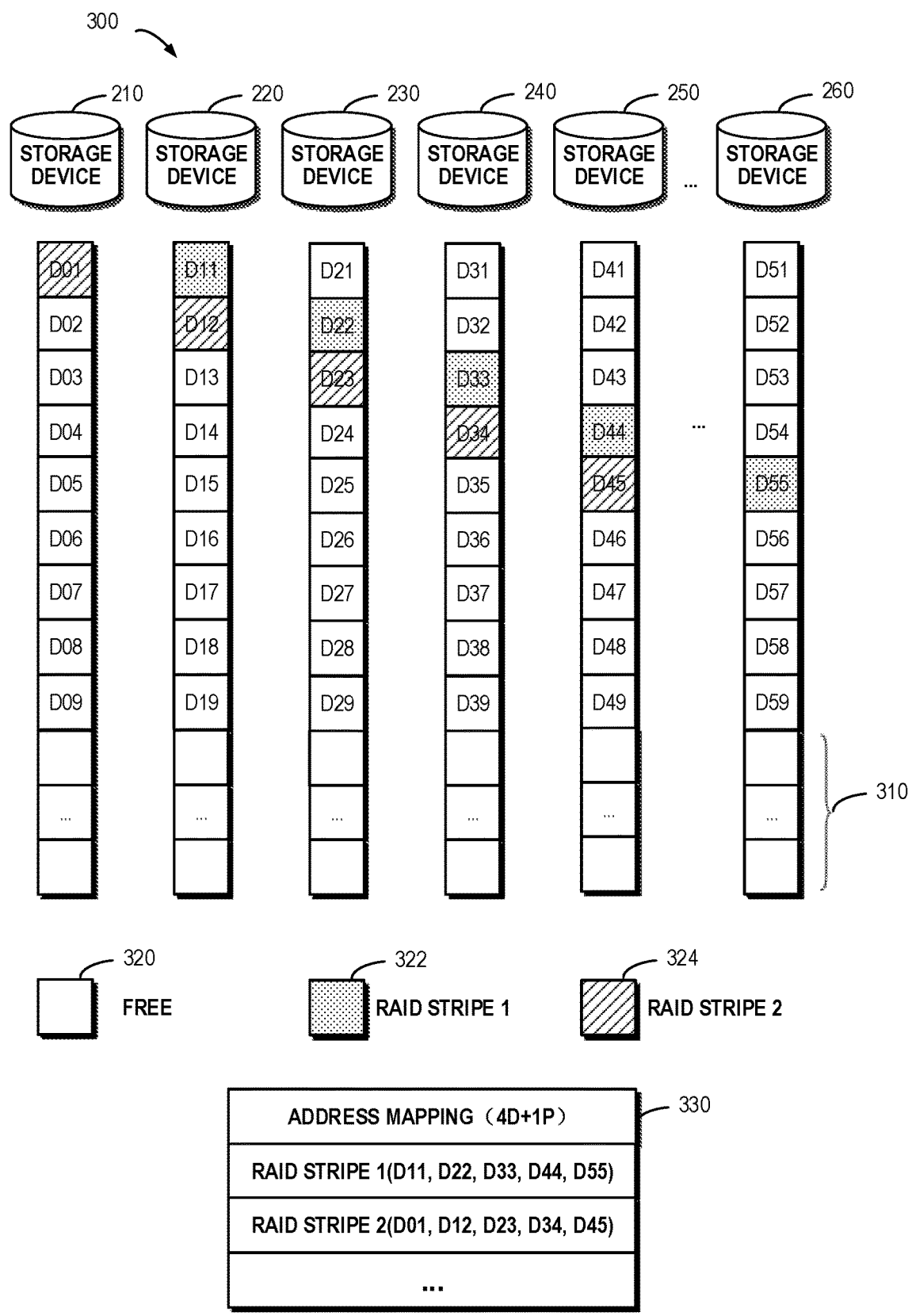
FIG. 3 schematically shows a block diagram of a storage resource pool in FIG. 2.

FIG. 3 schematically shows a block diagram of more information of the storage resource pool 270 as shown in FIG. 2. The resource pool 270 may include a plurality of storage devices 210, 220, 230, 240, 250, . . . , 260. Each storage device may include a plurality of extents, wherein a blank extent (e.g., denoted by a legend 320) represents a spare extent, a shaded extent (e.g., denoted by a legend 322) represents an extent for RAID stripe 1 of the storage system 110A in FIG. 1, and an extent shown with slashes (e.g., denoted by a legend 324) represents an extent for RAID stripe 2 of the storage system 110A in FIG. 1. At this point, extents D11, D22, D33 and D44 for RAID stripe 1 are used for storing data blocks of the stripe, respectively, and extent D55 is used for storing a parity of data. Extents D01, D12, D23 and D34 for RAID stripe 2 are used for storing data blocks of the stripe, respectively, and extent D45 is used for storing a parity of data.

As shown in FIG. 3, an address mapping 330 shows associations between a stripe and addresses of extents in the stripe. For example, RAID stripe 1 may include 5 extents, namely D11, D22, D33, D44 and D55, which reside on the storage devices 210, 220, 230, 240 and 250, respectively. As shown in FIG. 3, specifically, extent D11 is the first extent in the storage device 220, extent D22 is the second extent in the storage device 230. As shown in FIG. 3, there may exist a reserved spare portion 310 in each storage device, so that when a storage device in the resource pool fails, an extent in the spare portion 310 in each storage device may be selected to rebuild various extents in the failed storage device.

Note in FIG. 3 the 4D+1P RAID-5 storage system is taken as an example to illustrate how extents in various stripes are distributed over a plurality of storage systems in the resource pool. When RAID based on other level is employed, those skilled in the art may implement concrete details on the basis of the above described principles. For example, in the 6D+1P+1Q RAID-6 storage system, 8 extents in each stripe may be distributed over a plurality of storage devices so as to ensure a load balance between the plurality of storage devices.

Figure 4A:
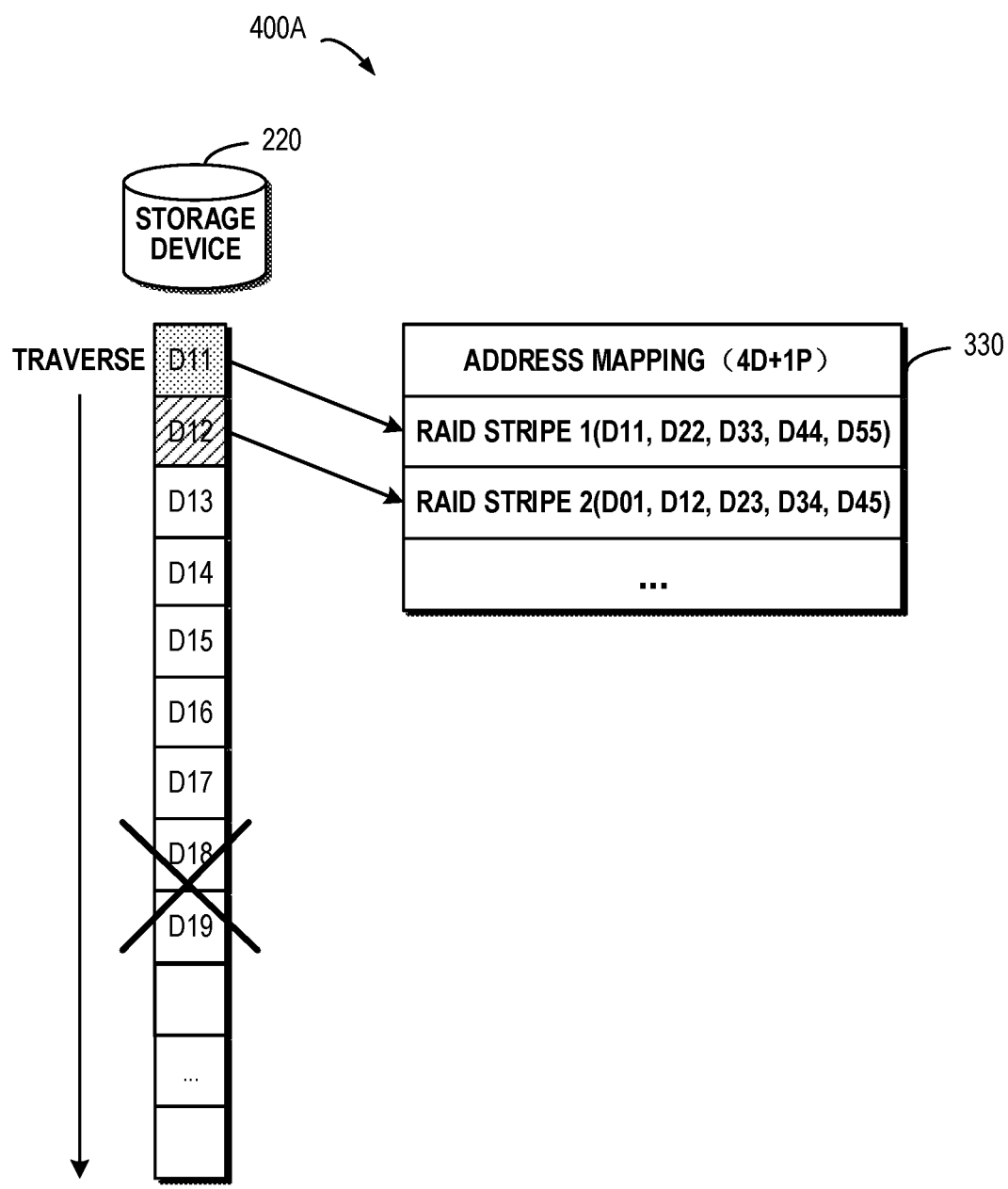
FIG. 4A schematically shows a block diagram for managing a storage system according to one technical solution.

It will be understood with the use of the storage system, one of more storage devices among the plurality of storage devices may fail, at which point a rebuild operation needs to be started so as to recover data in failed storage device(s) to normal storage device(s) for the purpose of avoiding data loss. Technical solutions for building a storage system have been proposed. For example, FIG. 4A schematically shows a block diagram 400A for managing a storage system according to one technical solution. As depicted, suppose the storage device 20 fails, then it is necessary to traverse each extent in the storage device 220. As seen from the address mapping 330, RAID stripe 1 uses the extent D11 in the failed storage device, so at this point RAID stripe 1 needs to be rebuilt. Further, as seen from the address mapping 330, RAID stripe 2 uses the extent D12 in the failed storage device, so at this point RAID stripe 2 needs to be rebuilt. Each extent in the storage device 220 may be traversed so as to find one or more strips that have used extents in the failed storage device 220 and perform a rebuild on the found one or more stripes.

Although the technical solution shown in FIG. 4A can rebuild data in the storage system, the technical solution takes a long execution time. For example, the storage device 220 may contain a large number of extents which have not been allocated for building RAID stripes. At this point, it is still necessary to traverse each extent in the storage device 220, which leads to a low rebuild efficiency and a long rebuild time. If a failure occurs in other storage device during the rebuild, then unrecoverable data loss will happen in the 4D+1P storage system. Therefore, it is desirable to improve the performance of the rebuild operation and reduce the time of the rebuild operation as much as possible.

To solve the above drawbacks, implementations of the present disclosure provide a method, device and computer program product for managing a storage system. Concrete implementations of the present disclosure will be described in detail below. According to one implementation of the present disclosure, a method for managing a storage system is provided. The storage system includes a plurality of stripes, and a plurality of extents included in one of the plurality of stripes reside on a plurality of storage devices in the storage system, respectively. The storage system includes an address mapping between the stripe and a plurality of storage device where the plurality of extents reside. In the method, a concept of rebuild queue is proposed, here the rebuild queue including a stripe that is to be rebuilt in the storage system.

On the one hand, a storage device may contain an extent which has not been allocated for building a RAID stripe. At this point, a rebuild queue may be built by traversing RAID stripes in the address mapping, so that extra overheads of processing extents which have not been allocated in storage devices may be avoided. On the other hand, by means of the rebuild queue, a rebuild operation may be performed in parallel on a plurality of stripes in the rebuild queue, so that stripes in the storage system may be rebuilt in a more effective way. With example implementations of the present disclosure, the performance of the rebuild operation may be improved, and time overheads of the rebuild operation may be reduced.

Figure 4B:
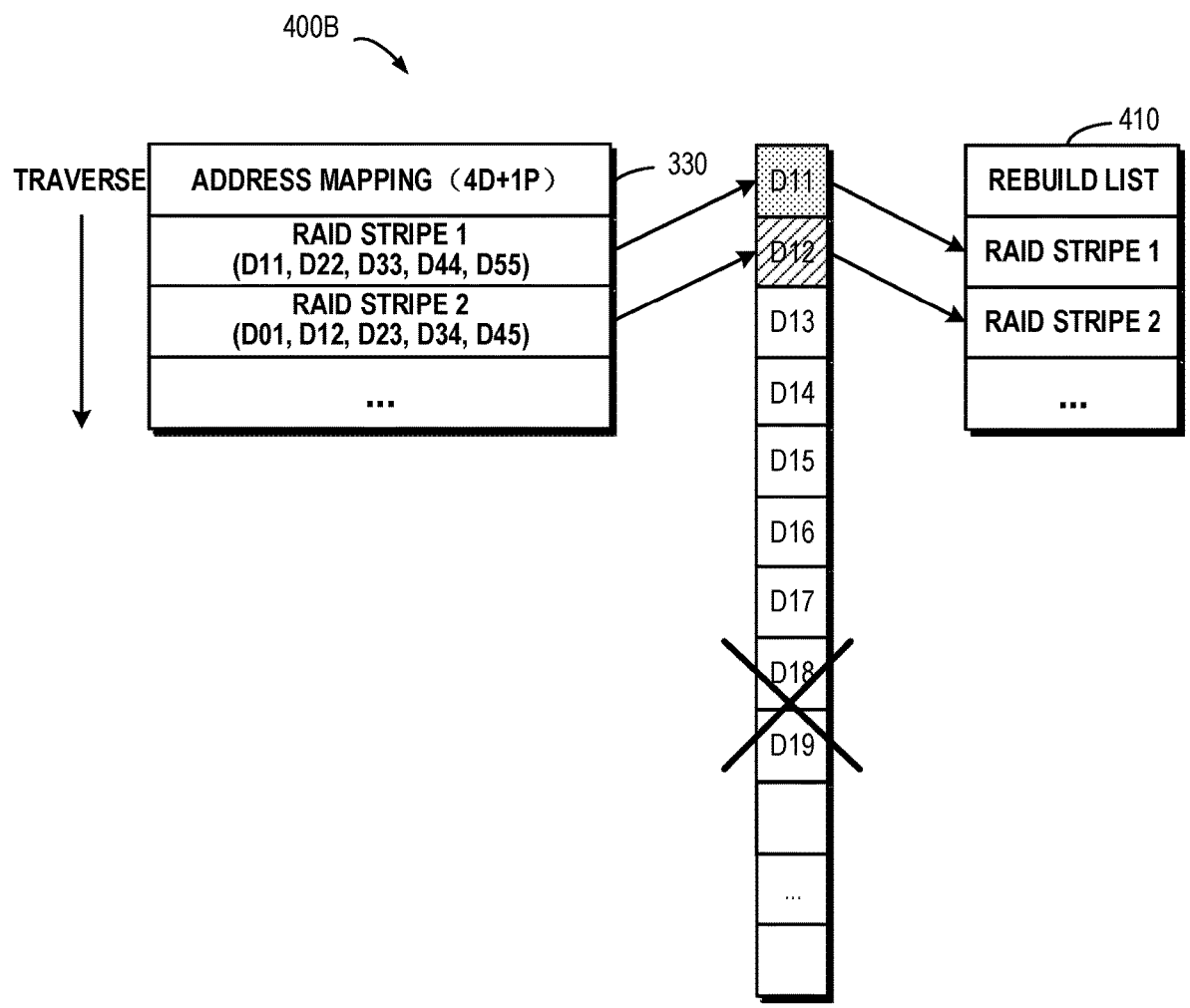
FIG. 4B schematically shows a block diagram for managing a storage system according to one implementation of the present disclosure.

With reference to FIG. 4B, description is presented below to the summary of schematic implementations of the present disclosure. FIG. 4B schematically shows a block diagram 400B for managing a storage system according to one implementation of the present disclosure. As depicted, a plurality of stripes in the address mapping 330 may be traversed. Here, a stripe may include a plurality of extents, and the number of extents may be determined based on the RAID level being used. For a 4D+1P storage system, the stripe may include 4+1=5 extents. Regarding one of the plurality of extents, a storage device among a plurality of storage devices where the extent resides may be determined based on the address mapping. For example, RAID stripe 1 may include 5 extents, and each extent may be processed one after another. First, a storage device in which one of the plurality of storage devices extent D11 resides may be determined based on the address mapping 330. At this point, it may be determined D11 resides on the device 220.

Subsequently, it may be determined whether the storage device 220 is a failed storage device or not. Suppose the storage device 220 fails, RAID stripe 1 may be added to a rebuild list 410 of the storage system. It will be understood in the 4D+1P storage system, only one storage device is allowed to fail; when two or more storage devices fail, then an unrecoverable error will arise. Therefore, when it is found one storage device fails, a rebuild operation needs to be started. If a 4D+2P storage system is used, then two storage devices are allowed to fail simultaneously. At this point, a rebuild operation may be started when it is found one or two storage devices fail.

Next, a subsequent stripe in the address mapping 330 may be processed. For example, RAID stripe 2 includes extents D01, D12, D23, D34 and D45. It may be determined one by one whether a storage device where each extent resides fails or not. If the storage device where extent D01 resides does not fail, then next extent D12 may be processed. Since extent D12 resides on the failed storage device 220, RAID stripe 2 may be added to the rebuild list 410. Other stripes in the address mapping 330 may be processed similarly. Further, the storage system may be rebuilt based on stripes in the rebuild list 410.

It will be understood although implementations for managing a storage system have been described by taking the resource pool 270 in a RAID-based storage system as one example in the context of the present disclosure, example implementations of the present disclosure may further be implemented in other resource pool including a different number of storage devices.

Figure 5:
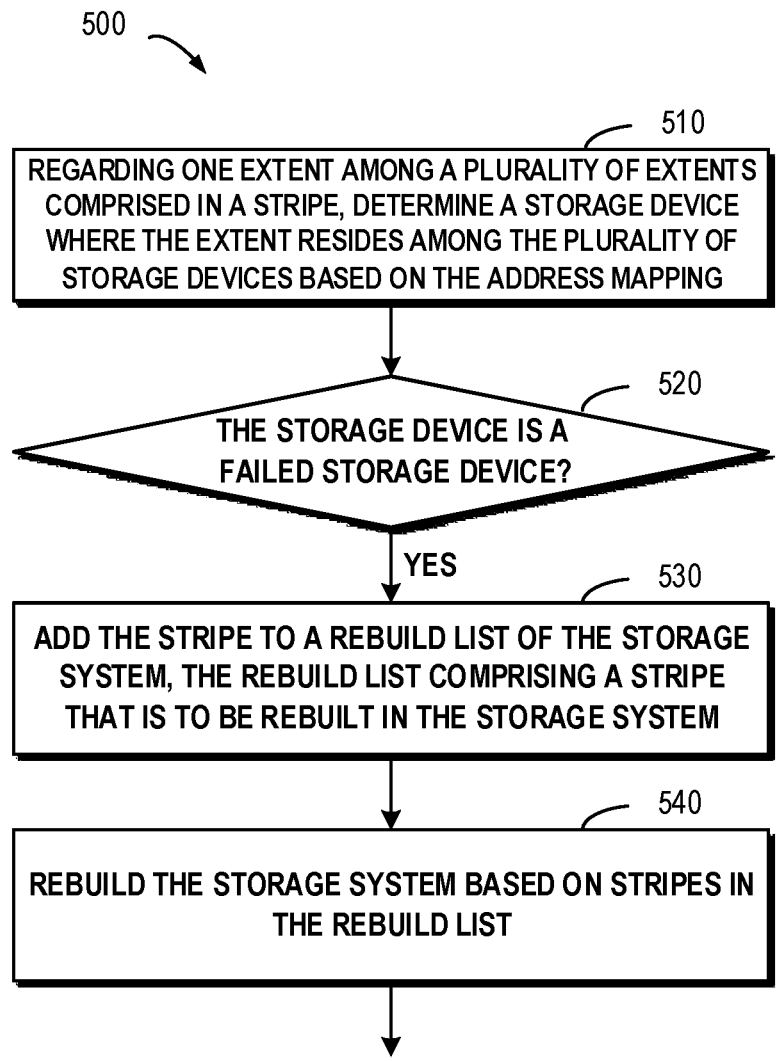
FIG. 5 schematically shows a flowchart of a method for managing a storage system according to one implementation of the present disclosure.

FIG. 5 schematically shows a flowchart of a method 500 for managing a storage system according to one implementation of the present disclosure. Here the storage system may include a plurality of stripes, e.g., the storage system may include RAID stripe 1 and RAID stripe 2 as shown in FIG. 4B. A plurality of extents included in one stripe of the plurality of stripes may reside in a plurality of storage devices in the storage system. For example, extent D11 in RAID stripe 1 may reside in the storage device 220, extent D22 may reside in the storage device 230, extent D33 may reside in the storage device 240, extent D44 may reside in the storage device 250, and extent D55 may reside in the storage device 260. The storage system includes the address mapping 330 between the stripe and a plurality of storage devices where the plurality of extents reside.

At block 510, regarding one extent among the plurality of extents, a storage device among the plurality of storage devices where the extent resides is determined based on the address mapping 330. As seen from the address mapping 330, a postfix of an extent identifier may represent an identifier of a storage device where the extent resides, and an address of the extent in the storage device, respectively. For example, regarding extent D01, the first postfix "0" may represent extent D01 resides in a storage device with an identifier of "0," and the second postfix "1" may represent extent D01 is the first extent in the storage device. For another example, regarding extent D21, the first postfix "2" may represent extent D21 resides in a storage device with an identifier of "2," and the second postfix "1" may represent extent D21 is the first extent in the storage device.

At block 520, it may be determined whether the storage device is a failed storage device or not. It may be determined based on the identifier of the storage device as determined at block 520 whether a failure occurs in the storage device or not. If a failure occurs, then the storage device is a failed storage device, at which point the method 500 proceeds to block 530. At block 530, if the storage device is determined as a failed storage device, then the stripe is added to the rebuild list 410 of the storage system, wherein the rebuild list 410 may include a stripe that is to be rebuilt in the storage system.

According to example implementations of the present disclosure, each stripe in the address mapping 330 may be traversed, and the process described at blocks 510, 520 and 530 is performed on each stripe in the storage system. At this point, the rebuild queue 410 may include one or more stripes to be rebuilt. Subsequently, at block 540, the storage system is rebuilt based on stripes in the rebuild list 410. The rebuild operation may be performed on each stripe in the rebuild list 410 in parallel, in series or a combination thereof. In order to rebuild the storage system based on stripes in the rebuild list 410, a free extent for rebuilding the extent may be selected from a group of storage devices other than the failed storage device among the plurality of storage devices, and data in the extent is rebuilt to the selected free extent.

According to example implementations of the present disclosure, since a load balance between the plurality of storage devices needs to be ensured, preferably the free extent may be selected from a storage device with a lighter workload. Specifically, workloads of the group of storage devices may be determined. Here, the workload may include content in various respects. For example, the workload of a storage device may be determined based on storage space in the storage device which has been used. Alternatively and/or additionally, the workload may further be determined based on other state of the storage device, such as processing resources, a bandwidth, etc. Here, a predetermined condition may be that a storage device with the lightest workload is selected. Alternatively and/or additionally, the predetermined condition may further be that a storage device with a lighter workload is selected. The storage device with the lightest/lighter workload may be selected from the group of storage devices, and the free extent may be selected from the determined storage device.

With example implementations of the present disclosure, it may be ensured that the rebuild process of the storage system proceeds in a way that workloads of the plurality of storage devices cause to be as far balanced as possible. On the one hand, the storage device with a lower workload among the plurality of storage devices may be utilized to increase the response speed, and on the other hand, it may be ensured that wear states of the plurality of storage devices are as much consistent as possible.

According to example implementations of the present disclosure, the rebuild operation is supposed to conform to RAID standards. In other words, a plurality of extents in the rebuilt RAID stripe should reside on different storage devices. Therefore, it should be ensured the free extent and other extents in the stripe reside on different storage devices. Specifically, if it is determined that the storage device with a lower workload is different from a storage device where any extent in the strip resides, then the free extent may be selected from this storage device. With example implementations of the present disclosure, it can be ensured that a plurality of extents in the rebuilt stripe reside on different storage devices. In this way, when a storage device where a certain extent in the rebuilt stripe fails, a rebuild may be performed once more based on the method 500 of the present disclosure.

It will be understood in the initialization stage of the storage system, the address mapping 330 may have been built (i.e., an extent has been allocated to a RAID stripe), but data has not been written to the stripe. At this point, it may be considered the stripe is not yet used. If a write request has written data to the stripe, it may be considered the stripe has been used. According to example implementations of the present disclosure, a metadata bitmap may be built, and one bit in the metadata bitmap may be used to indicate whether one stripe among the plurality of stripes has been used. More details about the metadata bitmap will be provided with reference to FIG. 6 below.

Figure 6:
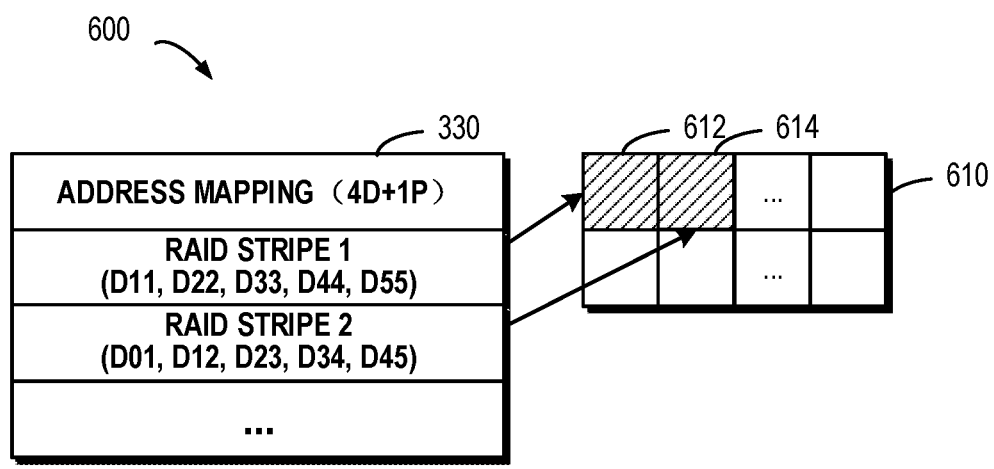
FIG. 6 schematically shows a block diagram of a metadata bitmap according to one implementation of the present disclosure.

FIG. 6 schematically shows a block diagram 600 of a metadata bitmap according to one implementation of the present disclosure. As depicted, a metadata bitmap 610 may include a plurality of bits, wherein one bit may be used to indicate whether one stripe among the plurality of stripes has been used. During the initialization of the storage system, the metadata bitmap is set to indicate none of the plurality of stripes has been used (e.g., shown as blank legends). During the operation of the storage system, if a write request for writing target data to a stripe is received, then the target data may be written to the stripe. For example, if a write request for writing data to RAID stripe 1 is received, then data may be written to RAID stripe 1, and a bit 612 corresponding to RAID stripe 1 in the metadata bitmap 610 may be updated. As shown in FIG. 6, the updated bit 612 is shown as a shaded legend. According to example implementations of the present disclosure, "1" may be used to represent a stripe has not been used, and "0" may be used to represent a stripe has been used. According to example implementations of the present disclosure, other way may further be used.

During the operation of the storage system, data may further be written to other RAID stripe in the storage system. If a write request for writing data to RAID stripe 2 is received, then data may be written to RAID stripe 2, and a bit 614 corresponding to RAID stripe 2 in the metadata bitmap 610 may be updated so as to indicate a stripe has been used. With example implementations of the present disclosure, the metadata bitmap 610 may be used to represent whether the stripe has been used. Therefore, while traversing the address mapping 330, it may be judged based on the metadata bitmap whether a stripe has been used, and a subsequent operation is only performed on a used stripe.

With example implementations of the present disclosure, the rebuild operation does not need to be performed on a stripe which has not been used, so an unused stripe may be skipped and the overall performance of the rebuild operation may be improved. At early days of the operation of the storage system, there may be a large number of unused stripes and data is written to only a few stripes. With the metadata bitmap, it is easy to differentiate stripes which have been used and further to improve the performance of the rebuild operation.

According to example implementations of the present disclosure, to rebuild data in the extent to the selected free extent, it may be determined based on the metadata bitmap 610 whether the stripe has been used or not. If yes, then data in the extent is rebuilt the selected free extent based on data in a group of extents other than the extent in the stripe. For example, regarding RAID stripe 1 in the rebuild list, it is clear from the bit 612 in the metadata bitmap 610 that RAID stripe 1 has been used. At this point, data in this stripe needs to be rebuilt. Since the extent D11 resides on the failed storage device, and data in the extent D11 has corrupted, data in the extent D11 may be recovered based on data in extents D22, D33, D44 and D55 in normal storage devices.

For another example, regarding RAID stripe 2 in the rebuild list, it is clear from the bit 614 in the metadata bitmap 610 that RAID stripe 2 has been used. At this point, data in this stripe needs to be rebuilt. Since the extent D12 resides on the failed storage device, and data in the extent D12 has corrupted, data in the extent D12 may be recovered based on data in extents D01, D23, D34 and D45 in normal storage devices.

According to example implementations of the present disclosure, if it is determined that the stripe has not been used, "null" is written to the free extent. At this point, an XOR operation does not need to be performed for recovering data, but only it is marked that data in the free extent is invalid. Although not shown, the address mapping 330 may further include more stripes. Suppose the address mapping 330 includes RAID stripe 3 (D02, D13, D24, D35, D46), and the stripe 3 is not used. Although the stripe 3 includes the extent D13 residing on the failed storage device 220, it may be determined based on the metadata bitmap 610 that the stripe 3 is not used, and then at this point "null" may be written to the free extent.

It will be understood since only real data rebuild (e.g., implemented based on an XOR operation) will lead to computing resources and time overheads in the storage system, and writing "null" will not produce extra computing resources and time overheads, with example implementations of the present disclosure, a rebuild operation on an unused extent may be skipped so as to reduce the rebuild time.

According to example implementations of the present disclosure, in order to improve the access performance of the storage system, a plurality of servers may be used to provide data write services and data read services to users of the storage system. For example, the storage system may include a first server and a second server, at which point the two servers may serve a plurality of data access requests in parallel. Each server may include its own metadata bitmap. For example, the first server may include a first metadata bitmap, and the second server may include a second metadata bitmap.

It will be understood since the two servers may serve different write requests in parallel, at this point the consistency between the first metadata bitmap and the second metadata bitmap needs to be ensured. According to example implementations of the present disclosure, if the metadata bitmap at one of the servers is updated, then the updated metadata bitmap may be synchronized to the other server. With example implementations of the present disclosure, on the one hand, it may be ensured that a plurality of servers may provide data access services in parallel, and on the other hand, it may be ensured that each server will run based on the latest usage state of a RAID stripe. In this way, stable operations of the storage system and the data consistency may be ensured.

It will be understood although FIG. 4B schematically shows a case in which an extent in a stripe has the same size as an extent in a storage device, the size of the extent in the stripe may further be less than that of the extent in the storage device. According to example implementations of the present disclosure, the extent in the stripe may further result from dividing one device extent among a plurality of device extents. More details will be described with reference to FIG. 7 below.

Figure 7:
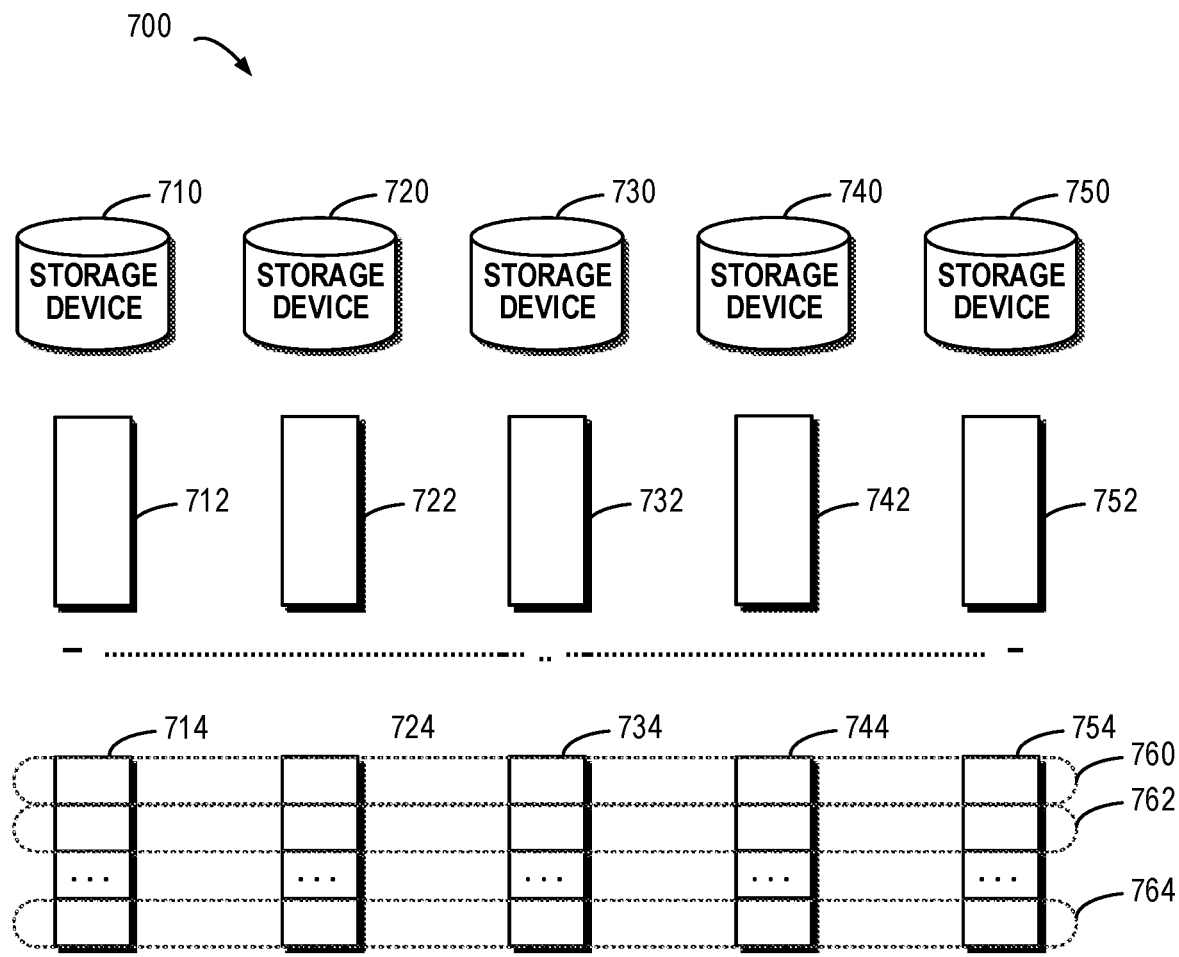
FIG. 7 schematically shows a block diagram of a relation between a device extent in a storage device and an extent in a stripe according to one implementation of the present disclosure.

FIG. 7 schematically shows a block diagram 700 of a relation between a device extent in a storage device and an extent in a stripe according to one implementation of the present disclosure. For the sake of description, FIG. 7 merely illustrates 5 storage devices 710, 720, 730, 740 and 750 for building a 4D+1P RAID storage system. Each storage device may include one or more device extents, and FIG. 7 merely illustrates one device extent in one storage device.

As shown in FIG. 7, the storage devices 710, 720, 730, 740 and 750 may include device extents 712, 722, 732, 742 and 752, respectively. The RAID stripe may be built based on these device extents 712, 722, 732, 742 and 752. For example, the device extents 712, 722, 732 and 742 may be used to store data, while the device extent 752 may be used to store a parity. It will be understood since a device extent usually has a large capacity, the device extent may further be divided into sub-extents for the sake of management. For example, each device extent may be divided into N (N is an integer) sub-extents, at which point the size of each sub-extent is 1/N as large as that of the device extent.

Sub-extents 714, 724, 734, 744 and 754 come from the device extents 712, 722, 732, 742 and 752, respectively. A RAID stripe may be built based on the sub-extents 714, 724, 734, 744 and 754, so as to provide a storage space management unit with finer granularity. In other words, RAID stripes 760, 762, . . . , and 764 may be built based on sub-extents across a plurality of storage devices. At this point, storage space in the RAID stripe in the address mapping 330 may have finer granularity.

With example implementations of the present disclosure, when traversing the address mapping 330, since RAID stripes may have finer granularity, the rebuild process may be controlled with finer granularity. Regarding the existing technical solution that a rebuild is performed on all device extents, once a part of device extents are used (e.g., only 1% of space is used), all device extents need to be rebuilt. Unlike the existing technical solution, since in the present disclosure a RAID stripe is built based on sub-extents of device extents, at this point a rebuild needs to be performed on only a RAID stripe where the used part resides. Regarding an unused stripe, a real rebuild operation does not need to be performed, but only "null" is written to the free extent.

Specifically, suppose 1% of device extents are used, and the remaining 99% are not used. If device extents are divided into 100 sub-extents, when 100 RAID stripes may be generated. When a rebuild operation needs to be performed, only 1 used stripe among the 100 RAID stripes need to be subjected to the rebuild operation. With example implementations of the present disclosure, the rebuild operation may be managed with finer granularity, the performance of the rebuild operation may be improved, and the time of the rebuild operation may be reduced.

Figure 8:
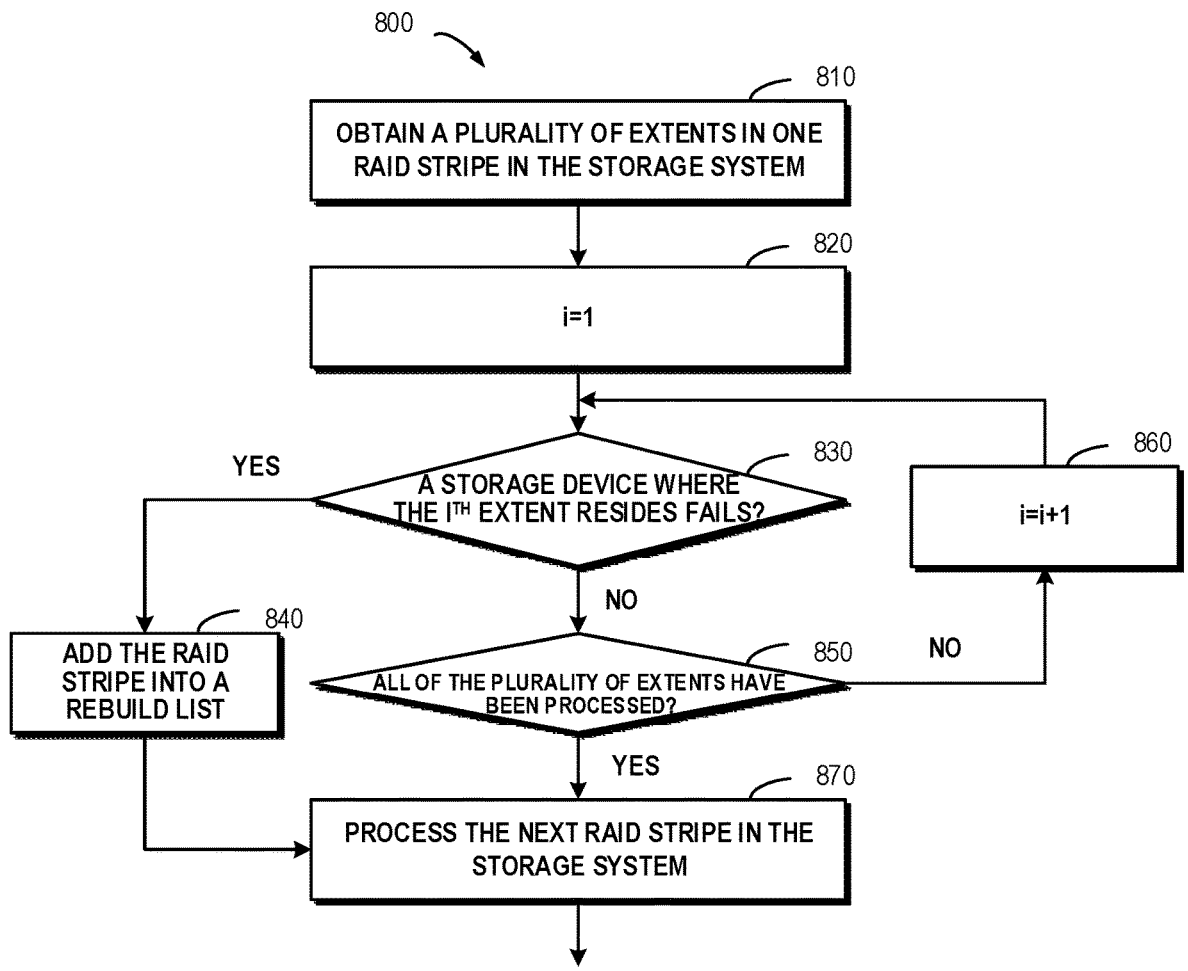
FIG. 8 schematically shows a flowchart of a method for managing a storage system according to one implementation of the present disclosure.

Description has been presented on how to process one extent in a RAID stripe. With reference to FIG. 8, description is presented below on how to traverse each RAID stripe in the address mapping and perform processing. FIG. 8 schematically shows a flowchart of a method 800 for managing a storage system according to one implementation of the present disclosure. Each RAID stripe in the address mapping may be traversed, and the method 800 may be performed on each stripe.

At block 810, a plurality of extents in one RAID stripe in the storage system may be obtained. At block 820, a counter i may be set to process each of the plurality of extents one after another. Initially, i may be set to 1. At block 830, it may be determined whether a storage device where the $i^{th}$ extent resides fails or not. If yes, the method 800 proceeds to block 840 so as to add the RAID stripe to the rebuild queue. If not, the method 800 proceeds to block 850, judging whether all extents in the RAID stripe have been processed or not. If not, the method 800 proceeds to block 850 to judge whether all extents have been processed. At block 850, if a judgment result is no, the method 800 proceeds to block 860 to process the next extent. If a judgment result is yes, the method 800 proceeds to block 870 to process the next RAID stripe in the storage system.

With example implementations of the present disclosure, extents in each of the plurality of RAID stripes may be processed one after another using the method 800. In this way, all RAID stripes in the storage system including extents that reside on the failed storage device may be added to the rebuild queue 410. It will be understood the rebuild queue 410 may include a plurality of stripes, at which point the plurality of stripes may be rebuilt in parallel. More details about a rebuild operation will be described with reference to FIG. 9 below.

Figure 9:
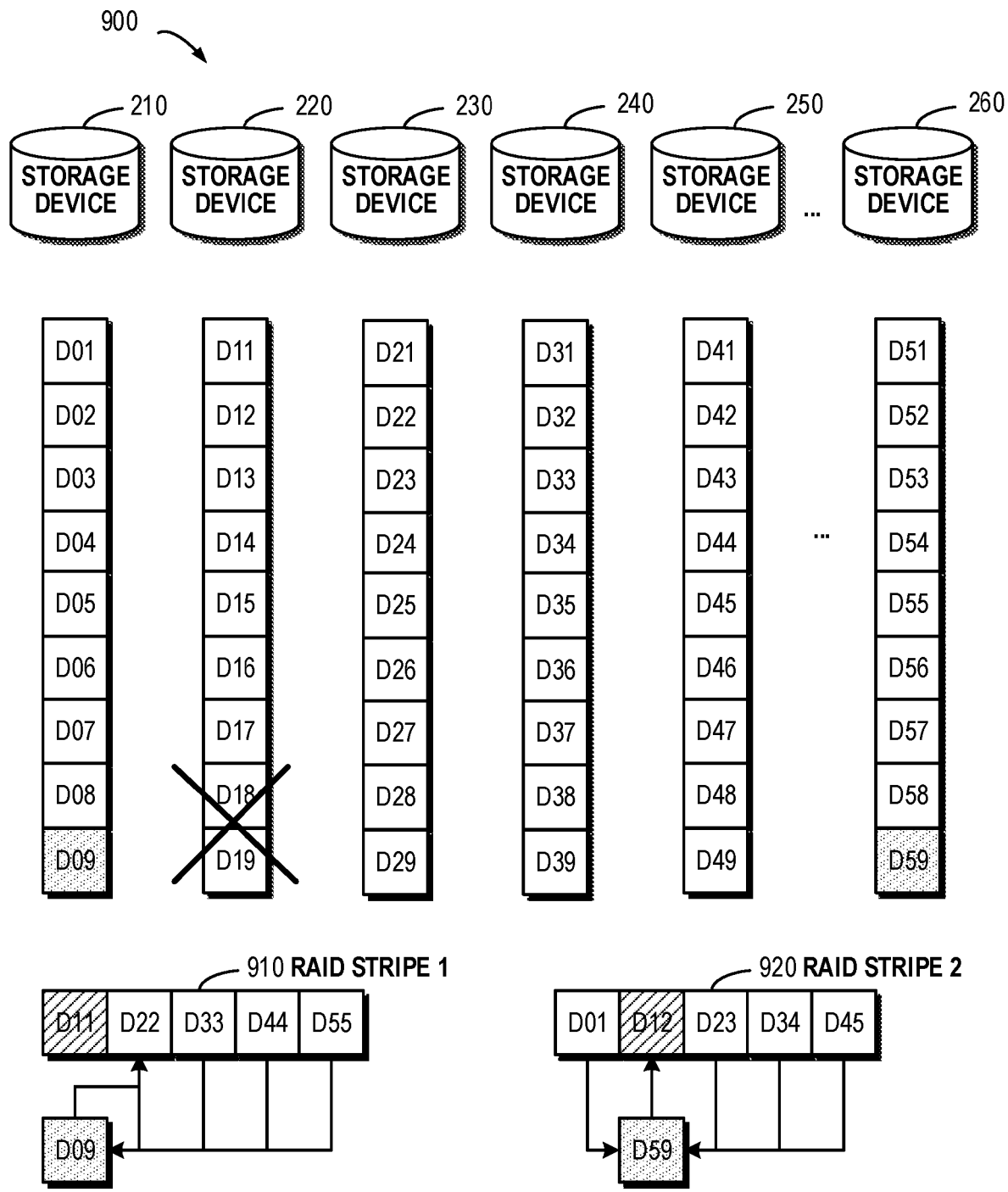
FIG. 9 schematically shows a block diagram of the process for rebuilding a stripe in a rebuild list according to one implementation of the present disclosure.

FIG. 9 schematically shows a block diagram 900 of the process for rebuilding stripes in the rebuild queue 410 according to one implementation of the present disclosure. Suppose the address mapping includes only RAID stripes 1 and 2 denoted by reference numerals 910 and 920, respectively, at which point the two stripes may be rebuilt in parallel. As depicted, RAID stripe 1 includes extents D11, D22, D33, D44 and D55. Since the storage device 220 where extent D11 resides fails, a free extent may be selected from the storage system. Based on requirements of load balance and RAID, a free extent D09 in the storage device 210 may be selected, and data in extent D11 may be rebuilt based on an XOR operation. In this way, RAID stripe 1 may be rebuilt.

RAID stripe 2 includes extents D01, D12, D23, D34 and D45. Since the storage device 220 where extent D12 resides fails, a free extent may be selected from the storage system. Based on requirements of load balance and RAID, a free extent D59 in the storage device 260 may be selected, and data in extent D12 may be rebuilt based on an XOR operation. Operations of rebuilding RAID stripe 1 and RAID stripe 2 may be performed in parallel. With example implementations of the present disclosure, the parallelism of rebuild operations may be increased, and further the performance of rebuild operations may be improved.

It will be understood although FIG. 9 only illustrates the case in which the rebuild list only includes two stripes, the rebuild list 410 may include more stripes. At this point, a plurality of stripes may be rebuilt in series, in parallel or a combination thereof. Further, although FIG. 9 merely illustrates the case in which the rebuild list only includes used stripes, the rebuild list 410 may further include unused stripes. At this point, when rebuilding an unused stripe, "null" may be written to a selected free extent without an XOR operation.

According to example implementations of the present disclosure, first it may be judged whether a stripe involving the failed storage device has been used or not. If yes, the stripe is added to the rebuild list 410. If not, a free extent may be selected directly, and "null" may be written to the free extent.

Figure 10:
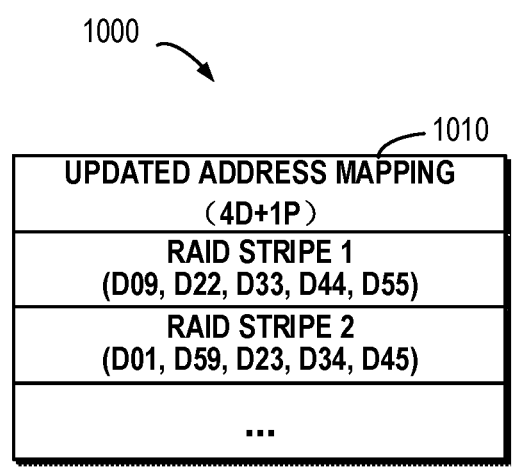
FIG. 10 schematically shows a block diagram of an address mapping updated based on a rebuilt stripe according to one implementation of the present disclosure.

It will be understood after performing a rebuild operation, extents included in a stripe will change, so the address mapping needs to be updated based on extents currently included in the RAID stripe. FIG. 10 schematically shows a block diagram 1000 of an address mapping which has been updated based on rebuilt stripes according to one implementation of the present disclosure. Since extent D11 in RAID stripe 1 has been replaced with extent D09, and extent D12 in RAID stripe 2 has been replaced with extent D59, in an updated address mapping 1010, RAID stripe 1 will include extents (D09, D22, D33, D44, D55), RAID stripe 2 will include extents (D01, D59, D23, D34, D45).

With example implementations of the present disclosure, the updated address mapping 1010 may reflect a latest mapping relation between various RAID stripes and extents in the storage system. Based on the updated address mapping 1010, subsequent data read requests and data write requests may be served.

According to example implementations of the present disclosure, the above method 500 may be performed when it is determined one of a plurality of storage devices fails. It will be understood the present disclosure has provided a technical solution for rebuilding data, and only when a failed storage device arises in the storage system, a rebuild operation will be started. Therefore, if there is no failed storage device in the storage system, the storage system may run in a conventional way. Once a failed storage device is detected in the storage system, the above method 500 may be performed.

According to example implementations of the present disclosure, the method 500 may perform a rebuild operation with higher performance. On the one hand, time overheads of the rebuild operation may be decreased, and on the other hand, the possibility that a further failed storage device occurs in the storage system during the rebuild operation may be reduced.

While examples of the method according to the present disclosure have been described in detail with reference to FIGS. 2 to 10, description is presented below to the implementation of a corresponding apparatus. According to example implementations of the present disclosure, provided is an apparatus for managing a storage system. The storage system includes a plurality of stripes, a plurality of extents comprised in one stripe among the plurality of stripes reside on a plurality of storage devices in the storage system, respectively, and the storage system includes an address mapping between the stripe and a plurality of storage devices where the plurality of extents reside. The apparatus includes: a determining module configured to, regarding one extent among the plurality of extents, determine a storage device where the extent resides among the plurality of storage devices based on the address mapping; an adding module configured to add the stripe to a rebuild list of the storage system in accordance with determining the storage device is a failed storage device, the rebuild list including a stripe that is to be rebuilt in the storage system; and a rebuilding module configured to rebuild the storage system based on stripes in the rebuild list.

According to example implementations of the present disclosure, the rebuilding module includes: a selecting module configured to select a free extent for rebuilding the extent from a group of storage devices other than the failed storage device among the plurality of storage devices; a data rebuilding module configured to rebuild data in the extent to the selected free extent; and an updating module configured to update the address mapping based on an address of the free extent.

According to example implementations of the present disclosure, the selecting module includes: a load module configured to determine workloads of the group of storage devices; a storage device selecting module configured to determine a storage device whose workload satisfies a predetermined condition in the group of storage devices; and an extent selecting module configured to select the free extent from the determined storage device.

According to example implementations of the present disclosure, the storage device selecting module is further configured to determine the storage device in accordance with determining the storage device is different from a storage device where any extent in the stripe resides.

According to example implementations of the present disclosure, the storage system further includes a metadata bitmap, one bit in the metadata bitmap being used to indicate whether one stripe among the plurality of stripes has been used or not, the apparatus further including: a setting module configured to, during an initialization operation of the storage system, set the metadata bitmap to indicate none of the plurality of stripes has been used; a writing module configured to write target data to the stripe in accordance with receiving a write request for writing the target data to the stripe; and a metadata updating module configured to update a bit corresponding to the stripe in the metadata bitmap so as to indicate the stripe has been used.

According to example implementations of the present disclosure, the data rebuilding module includes: a usage state determining module configured to determine whether the stripe has been used or not in accordance with the metadata bitmap; a real rebuilding module configured to, in accordance with determining the stripe has been used, rebuild data in the extent to the selected free extent based on data in a group of extents other than the extent in the stripe; and a virtual rebuilding module configured to write "null" to the free extent in accordance with determining the stripe has not been used.

According to example implementations of the present disclosure, the metadata bitmap resides in one server in the storage system which is used to process read requests and write requests to the storage system, the storage system further includes another server and the apparatus further includes: a synchronizing module configured to, in accordance with determining the metadata bitmap has been updated, synchronize the updated metadata bitmap to the another server.

According to example implementations of the present disclosure, a storage device among the plurality of storage devices includes a plurality of device extents, wherein the extent results from dividing one device extent among the plurality of device extents.

According to example implementations of the present disclosure, the rebuilding module includes: a parallel module configured to, in accordance with determining the rebuild list includes a plurality of stripes, rebuild the plurality of stripes in parallel.

According to example implementations of the present disclosure, the apparatus is invoked in accordance with determining one of the plurality of storage devices fails.

Figure 11:
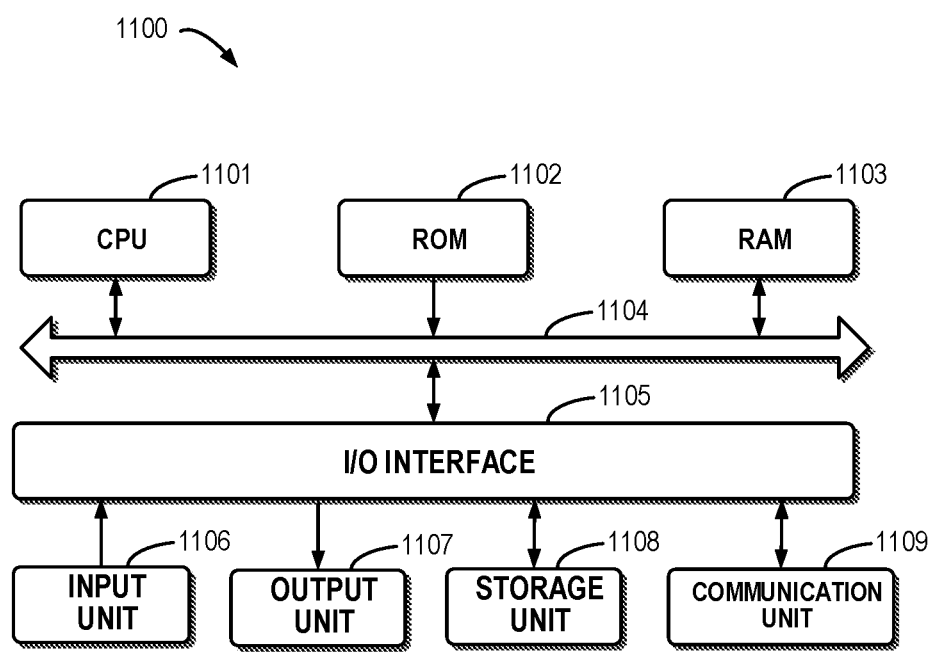
FIG. 11 schematically shows a block diagram of a device for managing a storage system according to example implementations of the present disclosure.

FIG. 11 schematically shows a block diagram of a device 1100 for managing a storage system according to example implementations of the present disclosure. As depicted, the device 1100 includes a central processing unit (CPU) 1101, which can execute various suitable actions and processing based on the computer program instructions stored in the read-only memory (ROM) 1102 or computer program instructions loaded in the random-access memory (RAM) 1103 from a storage unit 1108. The RAM 1103 can also store all kinds of programs and data required by the operations of the device 1100. CPU 1101, ROM 1102 and RAM 1103 are connected to each other via a bus 1104. The input/output (I/O) interface 1105 is also connected to the bus 1104.

A plurality of components in the device 1100 are connected to the I/O interface 1105, including: an input unit 1106, such as a keyboard, mouse and the like; an output unit 1107, e.g., various kinds of displays and loudspeakers etc.; a storage unit 1108, such as a magnetic disk and optical disk, etc.; and a communication unit 1109, such as a network card, modem, wireless transceiver and the like. The communication unit 1109 allows the device 1100 to exchange information/data with other devices via the computer network, such as Internet, and/or various telecommunication networks.

The above described process and treatment, such as the methods 500 and 800 can also be executed by the processing unit 1101. For example, in some implementations, the methods 500 and 800 can be implemented as a computer software program tangibly included in the machine-readable medium, e.g., the storage unit 1108. In some implementations, the computer program can be partially or fully loaded and/or mounted to the device 1100 via ROM 1102 and/or the communication unit 1109. When the computer program is loaded to the RAM 1103 and executed by the CPU 1101, one or more steps of the above described methods 500 and 800 can be implemented. Alternatively, in other implementations, the CPU 1101 also can be configured in other suitable manners to realize the above procedure/method.

According to example implementations of the present disclosure, provided is a device for managing a storage system. The storage system includes a plurality of stripes, a plurality of extents comprised in one stripe among the plurality of stripes reside on a plurality of storage devices in the storage system, respectively, and the storage system includes an address mapping between the stripe and a plurality of storage devices where the plurality of extents reside. The device includes: at least one processor; a volatile memory; and a memory coupled to the at least one processor, the memory having instructions stored thereon, the instructions, when executed by the at least one processor, causing the device to perform acts. The acts include: determining a storage device where the extent resides among the plurality of storage devices based on the address mapping; adding the stripe to a rebuild list of the storage system in accordance with determining the storage device is a failed storage device, the rebuild list including a stripe that is to be rebuilt in the storage system; and rebuilding the storage system based on stripes in the rebuild list.

According to example implementations of the present disclosure, rebuilding the storage system based on stripes in the rebuild list includes: selecting a free extent for rebuilding the extent from a group of storage devices other than the failed storage device among the plurality of storage devices; rebuilding data in the extent to the selected free extent; and updating the address mapping based on an address of the free extent.

According to example implementations of the present disclosure, selecting a free extent for rebuilding the extent includes: determining workloads of the group of storage devices; determining a storage device whose workload satisfies a predetermined condition in the group of storage devices; and selecting the free extent from the determined storage device.

According to example implementations of the present disclosure, determining a storage device whose workload satisfies a predetermined condition in the group of storage devices includes: determining the storage device in accordance with determining the storage device is different from a storage device where any extent in the stripe resides.

According to example implementations of the present disclosure, the storage system further includes a metadata bitmap, one bit in the metadata bitmap being used to indicate whether one stripe among the plurality of stripes has been used or not, the acts further including: during an initialization operation of the storage system, setting the metadata bitmap to indicate none of the plurality of stripes has been used; writing target data to the stripe in accordance with receiving a write request for writing the target data to the stripe; and updating a bit corresponding to the stripe in the metadata bitmap so as to indicate the stripe has been used.

According to example implementations of the present disclosure, rebuilding data in the extent to the selected free extent includes: determining whether the stripe has been used or not in accordance with the metadata bitmap; in accordance with determining the stripe has been used, rebuilding data in the extent to the selected free extent based on data in a group of extents other than the extent in the stripe; and writing "null" to the free extent in accordance with determining the stripe has not been used.

According to example implementations of the present disclosure, the metadata bitmap resides in one server in the storage system which is used to process read requests and write requests to the storage system, the storage system further includes another server and the acts further includes: in accordance with determining the metadata bitmap has been updated, synchronizing the updated metadata bitmap to the another server.

According to example implementations of the present disclosure, a storage device among the plurality of storage devices includes a plurality of device extents, wherein the extent results from dividing one device extent among the plurality of device extents.

According to example implementations of the present disclosure, rebuilding the storage system based on stripes in the rebuild list includes: in accordance with determining the rebuild list includes a plurality of stripes, rebuilding the plurality of stripes in parallel.

According to example implementations of the present disclosure, the acts are performed in accordance with determining one of the plurality of storage devices fails.

According to example implementations of the present disclosure, there is provided a computer program product. The computer program product is tangibly stored on a non-transient computer readable medium and includes machine executable instructions which are used to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be a method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, an electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including local area network (LAN) and wide area network (WAN), or to the external computer (e.g., connected via Internet using an Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow charts and/or block diagrams of method, apparatus (system) and computer program products according to implementations of the present disclosure. It should be understood that each block of the flow charts and/or block diagrams and the combination of various blocks in the flow charts and/or block diagrams can be implemented by computer-readable program instructions.

The computer-readable program instructions can be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, the other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow charts and block diagrams in the drawings illustrate system architecture, functions and operations that may be implemented by system, method and computer program products according to a plurality of implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order depending on the functions involved. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable others of ordinary skill in the art to understand implementations of the present disclosure.

We claim:

1. A method for managing a storage system, the storage system comprising a plurality of stripes, a plurality of extents comprised in one stripe among the plurality of stripes residing on a plurality of storage devices in the storage system, respectively, the storage system comprising an address mapping between the stripe and a plurality of storage devices where the plurality of extents reside, the method comprising: regarding one extent among the plurality of extents, determining a storage device where the extent resides among the plurality of storage devices based on the address mapping;

adding the stripe to a rebuild list of the storage system in accordance with determining the storage device is a failed storage device, the rebuild list comprising a stripe that is to be rebuilt in the storage system; and rebuilding the storage system based on stripes in the rebuild list;

wherein the storage system further comprises a metadata bitmap, one bit in the metadata bitmap being used to indicate whether one stripe among the plurality of stripes has been used or not; and wherein the metadata bitmap resides in one server in the storage system which is used to process read requests and write requests to the storage system, the storage system further comprising a further server, the method further comprising:

in accordance with determining the metadata bitmap has been updated, synchronizing the updated metadata bitmap to the further server.

2. The method of claim 1, wherein rebuilding the storage system based on the stripes in the rebuild list comprises:

selecting a free extent for rebuilding the extent from a group of storage devices other than the failed storage device among the plurality of storage devices;

rebuilding data in the extent to the selected free extent; and updating the address mapping based on an address of the free extent.

3. The method of claim 2, wherein selecting the free extent for rebuilding the extent comprises:

determining workloads of the group of storage devices;

determining a storage device whose workload satisfies a predetermined condition in the group of storage devices; and selecting the free extent from the determined storage device.

4. The method of claim 3, wherein determining the storage device whose workload satisfies the predetermined condition in the group of storage devices comprises:

determining the storage device in accordance with determining the storage device is different from a storage device where any extent in the stripe resides.

5. The method of claim 2, further comprising:

during an initialization operation of the storage system, setting the metadata bitmap to indicate none of the plurality of stripes has been used;

writing target data to the stripe in accordance with receiving a write request for writing the target data to the stripe; and updating a bit corresponding to the stripe in the metadata bitmap so as to indicate that the stripe has been used.

6. The method of claim 5, wherein rebuilding the data in the extent to the selected free extent comprises:

determining whether the stripe has been used or not in accordance with the metadata bitmap;

rebuilding the data in the extent to the selected free extent based on data in a group of extents other than the extent in the stripe in accordance with determining the stripe has been used; and writing "null" to the free extent in accordance with determining the stripe has not been used.

7. The method of claim 1, wherein a storage device among the plurality of storage devices comprises a plurality of device extents, wherein the extent results from dividing one device extent among the plurality of device extents.

8. The method of claim 1, wherein rebuilding the storage system based on the stripes in the rebuild list comprises:

in accordance with determining the rebuild list comprises a plurality of stripes, rebuilding the plurality of stripes in parallel.

9. The method of claim 1, further comprising:

determining that a second extent resides on the storage device based on the address mapping, the second extent belonging to a second stripe;

after determining that the second extent resides on the storage device, determining that the second stripe is unused; and refraining from adding the second stripe to the rebuild list in response to determining that the second stripe is unused.

10. The method of claim 9, wherein determining that the second stripe is unused includes:

checking a bit of the metadata bitmap, the bit corresponding to the second stripe.

11. A device for managing a storage system, the storage system comprising a plurality of stripes, a plurality of extents comprised in one stripe among the plurality of stripes residing on a plurality of storage devices in the storage system, respectively, the storage system comprising an address mapping between the stripe and a plurality of storage devices where the plurality of extents reside, the device comprising:

at least one processor; and a memory coupled to the at least one processor and having instructions stored thereon, the instructions, when executed by the at least one processor, causing the device to perform acts, including:

determining a storage device where the extent resides among the plurality of storage devices based on the address mapping;

adding the stripe to a rebuild list of the storage system in accordance with determining the storage device is a failed storage device, the rebuild list comprising a stripe that is to be rebuilt in the storage system; and rebuilding the storage system based on stripes in the rebuild list;

wherein the storage system further comprises a metadata bitmap, one bit in the metadata bitmap being used to indicate whether one stripe among the plurality of stripes has been used or not; and wherein the metadata bitmap resides in one server in the storage system which is used to process read requests and write requests to the storage system, the storage system further comprising a further server, the acts further comprising:

in accordance with determining the metadata bitmap has been updated, synchronizing the updated metadata bitmap to the further server.

12. The device of claim 11, wherein rebuilding the storage system based on stripes in the rebuild list comprises:

selecting a free extent for rebuilding the extent from a group of storage devices other than the failed storage device among the plurality of storage devices;

rebuilding data in the extent to the selected free extent; and updating the address mapping based on an address of the free extent.

13. The device of claim 12, wherein selecting the free extent for rebuilding the extent comprises:

determining workloads of the group of storage devices;

determining a storage device whose workload satisfies a predetermined condition in the group of storage devices; and selecting the free extent from the determined storage device.

14. The device of claim 13, wherein determining the storage device whose workload satisfies the predetermined condition in the group of storage devices comprises:

determining the storage device in accordance with determining the storage device is different from a storage device where any extent in the stripe resides.

15. The device of claim 12, the acts further comprising:
during an initialization operation of the storage system, setting the metadata bitmap to indicate none of the plurality of stripes has been used;
writing target data to the stripe in accordance with receiving a write request for writing the target data to the stripe; and
updating a bit corresponding to the stripe in the metadata bitmap so as to indicate that the stripe has been used.

16. The device of claim 15, wherein rebuilding the data in the extent to the selected free extent comprises:
determining whether the stripe has been used or not in accordance with the metadata bitmap;
rebuilding the data in the extent to the selected free extent based on data in a group of extents other than the extent in the stripe in accordance with determining the stripe has been used; and
writing "null" to the free extent in accordance with determining the stripe has not been used.

17. The device of claim 11, wherein a storage device among the plurality of storage devices comprises a plurality of device extents, wherein the extent results from dividing one device extent among the plurality of device extents.

18. The device of claim 11, wherein rebuilding the storage system based on the stripes in the rebuild list comprises:
in accordance with determining the rebuild list comprises a plurality of stripes, rebuilding the plurality of stripes in parallel.

19. A computer program product having a non-transitory computer readable medium which stores a set of instructions to manage a storage system comprising a plurality of stripes, a plurality of extents comprised in one stripe among the plurality of stripes residing on a plurality of storage devices in the storage system, respectively, the storage system comprising an address mapping between the stripe and a plurality of storage devices where the plurality of extents reside; the set of instructions, when carried out by computerized circuitry, causing the computerized circuitry to perform a method of: regarding one extent among the plurality of extents,
determining a storage device where the extent resides among the plurality of storage devices based on the address mapping;
adding the stripe to a rebuild list of the storage system in accordance with determining the storage device is a failed storage device, the rebuild list comprising a stripe that is to be rebuilt in the storage system; and
rebuilding the storage system based on stripes in the rebuild list;
wherein the storage system further comprises a metadata bitmap, one bit in the metadata bitmap being used to indicate whether one stripe among the plurality of stripes has been used or not; and
wherein the metadata bitmap resides in one server in the storage system which is used to process read requests and write requests to the storage system, the storage system further comprising a further server, the method further comprising:
in accordance with determining the metadata bitmap has been updated, synchronizing the updated metadata bitmap to the further server.

20. The computer program product of claim 19, wherein the method further comprises:
during an initialization operation of the storage system, setting the metadata bitmap to indicate none of the plurality of stripes has been used;
writing target data to the stripe in accordance with receiving a write request for writing the target data to the stripe; and
updating a bit corresponding to the stripe in the metadata bitmap so as to indicate that the stripe has been used.

* * * * *